(12) United States Patent
Kung

(10) Patent No.: US 11,640,018 B2
(45) Date of Patent: May 2, 2023

(54) FLOATING MIRRORS TO LIMIT GLOBAL TEMPERATURE RISE AND METHODS OF USE

(71) Applicant: Robert T. V. Kung, Andover, MA (US)

(72) Inventor: Robert T. V. Kung, Andover, MA (US)

( * ) Notice: Subject to any disclaimer, the term of this patent is extended or adjusted under 35 U.S.C. 154(b) by 167 days.

(21) Appl. No.: 17/181,172

(22) Filed: Feb. 22, 2021

(65) Prior Publication Data

US 2022/0268979 A1 Aug. 25, 2022

(51) Int. Cl.
*G02B 5/10* (2006.01)
*B63B 22/00* (2006.01)
*A01G 15/00* (2006.01)
*G02B 5/08* (2006.01)

(52) U.S. Cl.
CPC .............. *G02B 5/10* (2013.01); *A01G 15/00* (2013.01); *B63B 22/00* (2013.01); *G02B 5/0808* (2013.01)

(58) Field of Classification Search
CPC ........ G02B 5/0808; G02B 5/10; A01G 15/00; B63B 22/00
USPC .......................................... 359/838, 868, 869
See application file for complete search history.

(56) References Cited

U.S. PATENT DOCUMENTS

| | | | |
|---|---|---|---|
| 505,414 A * | 9/1893 | Smith | |
| 3,054,328 A * | 9/1962 | Rodgers | G02B 26/0825 353/3 |
| 3,441,936 A * | 4/1969 | Heine | F16C 32/00 343/765 |
| 3,579,893 A * | 5/1971 | Wolfe | A01K 93/02 441/20 |
| 5,404,868 A * | 4/1995 | Sankrithi | F24S 30/48 126/696 |
| 5,410,463 A * | 4/1995 | Jean | F21S 10/00 362/398 |
| 5,996,943 A | 12/1999 | Gode | |
| 6,966,523 B2 * | 11/2005 | Colting | B64B 1/32 244/30 |
| 9,775,305 B2 | 10/2017 | Choi | |
| 2006/0269700 A1 * | 11/2006 | Safer | B44F 1/066 428/11 |
| 2010/0252647 A1 | 10/2010 | Ace | |
| 2010/0300510 A1 | 12/2010 | Goldman et al. | |
| 2011/0013271 A1 | 1/2011 | Kawai | |
| 2011/0277815 A1 | 11/2011 | Sankrithi | |
| 2012/0180376 A1 * | 7/2012 | Nelson | A01K 93/00 43/44.9 |
| 2020/0389120 A1 * | 12/2020 | El Hajje | H02S 40/425 |

FOREIGN PATENT DOCUMENTS

| | | |
|---|---|---|
| CN | 111392797 A | 7/2020 |
| JP | 5717276 B2 | 5/2015 |
| KR | 20200058669 A | 5/2020 |

* cited by examiner

*Primary Examiner* — Ricky D Shafer
(74) *Attorney, Agent, or Firm* — Wei & Sleman LLP

(57) ABSTRACT

A floating mirror includes a buoyant body extending between a first end and a second end, and a reflective material disposed on opposite surfaces of the buoyant body.

19 Claims, 3 Drawing Sheets

FLOATING MIRRORS TO LIMIT GLOBAL TEMPERATURE RISE AND METHODS OF USE

FIELD OF THE DISCLOSURE

The present disclosure relates to devices and methods to limit the rise of global temperatures. More particularly the present disclosure relates to floating mirrors to achieve same.

BACKGROUND OF THE DISCLOSURE

The warming of the earth due to factors like fossil fuels has rapidly increased greenhouse gases over the past decades leading to global temperature increases. Greenhouse gas trapping of infrared radiation has led to an international effort to study multiple scenarios that could lead to elevated global temperature relative to pre-industrial temperature. According to some studies, the temperature increase estimates range from 1.5° Celsius in the best case to approximately 3° C. in a worse case by 2100. Additionally, according to some studies, current temperature rise is already 0.87° Celsius compared to that of the pre-industrial reference. The recent Intergovernmental Panel on Climate Change Special Report SR15 stresses the need to limit global temperature increase over pre-industrial level to no more than 1.5° Celsius.

Additionally, polar ice shelf loss may cause a positive feedback effect further accelerating global warming. Using Antarctica as an example, its albedo (0.6-0.7) is dominated by the ice shelf with values of 0.8-0.9 according to one study. If ice shelf instability and losses lead to an Antarctica albedo reduction of 0.1, it may lead to an equivalence of approximately 3 W/$M^2$ of additional solar radiation penetration and absorption by the earth. This added solar input may translate into an additional radiative forcing of approximately 0.75 W/$M^2$. Such an amount may start to interfere with the efforts required to achieve the desirable RCP 1.9 (Representative Concentration Pathway 1.9 W/$M^2$ radiative forcing). This level of added radiative forcing could also potentially derail the RCP 1.9 efforts and turn the associated carbon dioxide reduction program for RCP 1.9 into RCP 2.6. The Antarctica example is used to illustrate how small changes in albedo in a local geographic area may have profound impact on radiative balance.

There has been a number of proposals for managing solar radiation, or Solar Radiation Management (SRM). These suggestions include the deployment of space deflectors, a ring of near-earth space mirrors, painting rooftops white, microbubble creation in the ocean by ships, low altitude marine cloud brightening using sea salt cloud seeding, high altitude aerosol deployment in the stratosphere, and others. Each of these suggestions has its own drawbacks and challenges such as cost, feasibility and practicality. Space deflectors and reflectors are very expensive to deploy and not easily retrievable. Cloud creation and aerosol deployment require constant replenishment, a potentially energy costly and environmentally adverse remedy.

SUMMARY OF THE DISCLOSURE

In some embodiments, a floating mirror includes a buoyant body extending between a first end and a second end, and a reflective material disposed on opposite surfaces of the buoyant body.

BRIEF DESCRIPTION OF THE DISCLOSURE

Various embodiments of the presently disclosed floating mirrors are disclosed herein with reference to the drawings, wherein.

Figure 1:
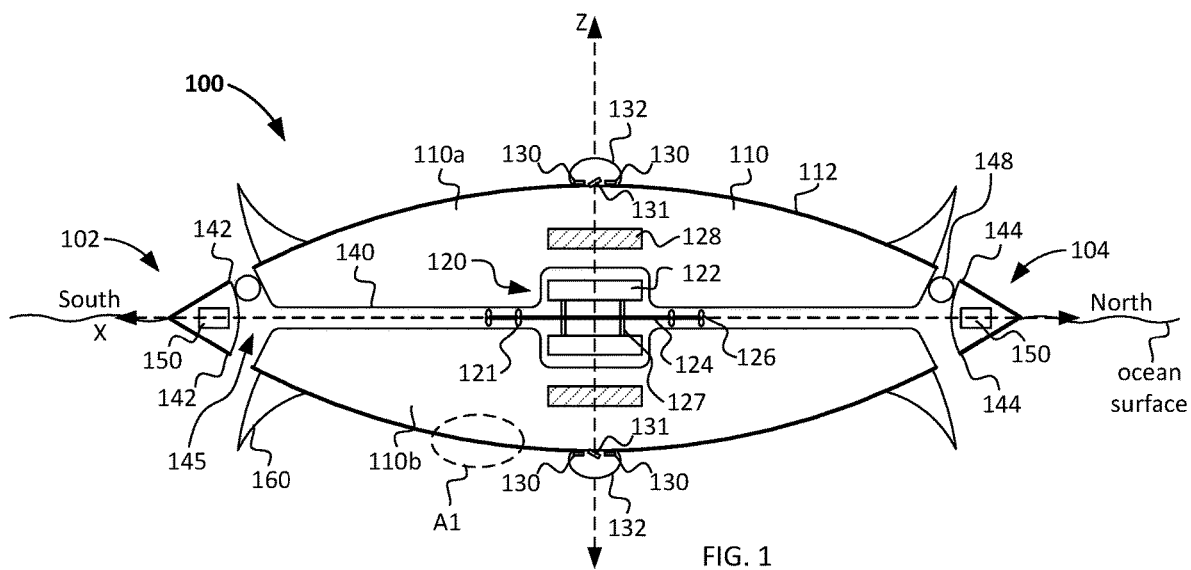
FIG. 1 is a schematic cross-sectional illustration of one example of a floating mirror.

Various embodiments of the present invention will now be described with reference to the appended drawings. It is to be appreciated that these drawings depict only some embodiments of the invention and are therefore not to be considered limiting of its scope.

DETAILED DESCRIPTION

Despite the various improvements that have been made to devices and methods of reducing global temperatures, conventional devices and methods suffer from some shortcomings as described above.

There therefore is a need for further improvements to the devices, systems, and methods of reducing global temperatures. Among other advantages, the present disclosure may address one or more of these needs.

In some embodiments, the present disclosure includes an armada of mirrors floating on the ocean near the equator to permit global temperature tuning. Using this floating mirror approach as an independent knob to mitigate temperature increase, a straight forward reflection of a small portion of the solar radiation that reaches the earth's surface back into space may reduce global temperature that is continuing to rise even with current greenhouse gas mitigation and carbon dioxide reduction approaches. Additionally, this approach may potentially stave off positive feedbacks that can negate climate mitigation efforts. This approach does not encroach on any national or private property rights, and the quantity of floating mirrors can be easily increased or decreased as needed.

A potentially effective way to increase the albedo of the earth thus countering the global temperature increase caused by the increase in atmospheric greenhouse gas load is the deployment of floating mirrors on the ocean surfaces near the equator for maximum mirror area utilization. Without being bound by any particular theory, it is believed that the earth's temperature is governed by the balance between global solar input and the radiative infrared emission into space. The earth's radioactive internal heat source is relatively miniscule compared to the solar input, approximately $2 \times 10^{-4}$ smaller than the total solar irradiance. The global temperature has settled around the average of ~300° K (Kelvin).

To put the concept in perspective, reducing the global temperature by 1° C. or K may require the reduction of 1/300 of the solar radiation that reaches the earth's surface. Since the albedo of the earth is approximately 0.3, not all reflected radiation using surface mirrors will be dispersed back into space. The albedo of the outward going reflected solar radiation will have 0.3 as the upper bound due to the absence of surface reflectivity from the outer space void. Thus, to achieve a 1° C. reduction may require ~1.4/300 solar radiance reduction (~0.5%) as an upper bound. This reduction is equivalent to ~1.2 W/M2 lowering in the radiative forcing. Using simple geometric consideration, this translates to a band of mirrors deployed around and on the open equatorial waters, slightly over one half of the earth's circumference (earth's diameter=12,700 Km), with ~90 Km width. With natural dispersion and the floating mirror containment features to be discussed below, the collection of floating mirrors may likely be dispersed, not clustered but confined to a few hundred kilometers near the equatorial waters.

Figure 2A:
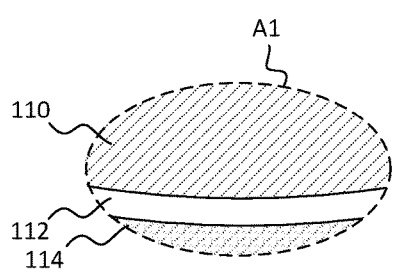
FIG. 2A is a schematic illustration of the coatings on the body of the floating mirror.
Figure 2B:
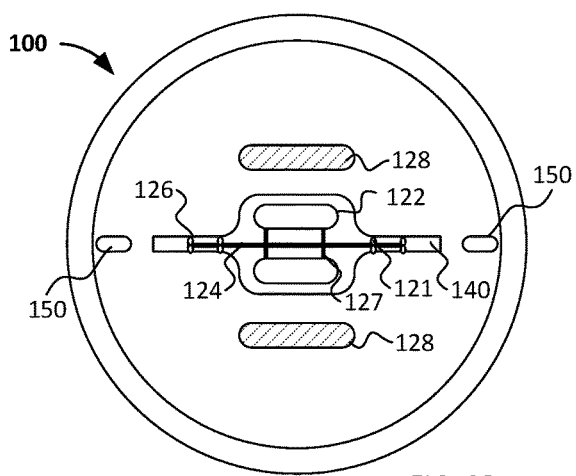
FIG. 2B is a schematic of an orthogonal cross-sectional view of the floating mirror of FIG. 1.
Figure 4A:
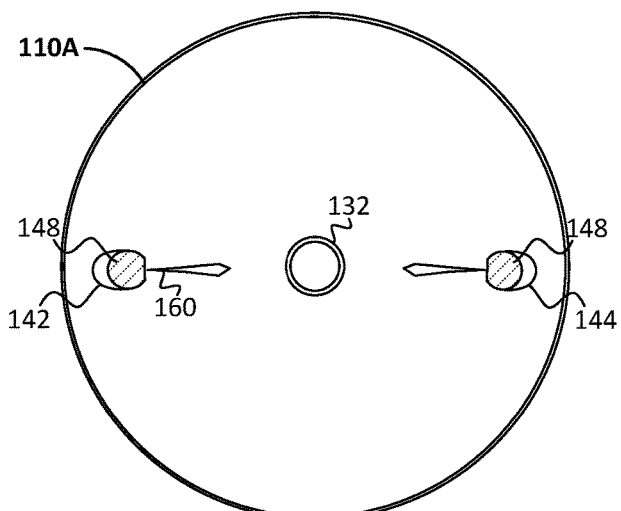
FIGS. 4A-C are schematic top views of certain examples of a floating mirror.
Figure 4B:
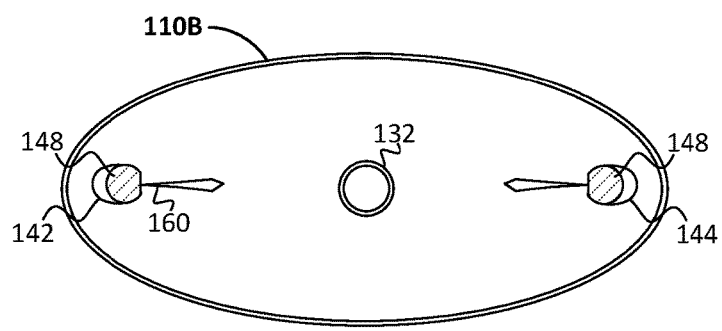
Figure 4C:
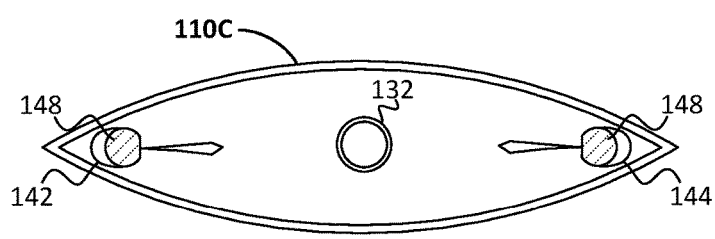

FIG. 1 illustrates one example of a floating mirror 100. Floating mirror 100 may extend between a first end 102 and a second 104. In one example, floating mirror is generally symmetrical about a plane containing a longitudinal axis X and a perpendicular vertical axis Z. In some examples, floating mirror 100 includes a body 110. Body 110 may have several shapes such as those seen in the top views of FIGS. 4A-C. For example, body 110A may be formed of two low convexity segments of spheres joined together (FIG. 4A), or low profile elliptical or oval domes that are joined together to form body 110B (FIG. 4B) or lens-shaped domes to form body 110C (FIG. 4C). Alternatively, body 110 may be in the shape of an oblate spheroid, a shape obtained by rotating an ellipse about its minor axis, or any other suitable shape. In at least some examples, body 110 includes a pair of convex discs 110a,110b that are coupled together via an adhesive or other suitable hermetic sealing method. Alternatively, body 110 is a single element instead of two conjoined elements. Whether made of separate members or unitarily formed, body 110 may be formed of a polymer, such as polyvinyl chloride (PVC), polytetrafluoroethylene (PTFE) or other polymer substrates or suitable materials sealed along its base rims. The outer surfaces of body 110 may be coated with a reflective material, such as elemental metal (e.g., aluminum) to form a mirror layer 112. Mirror layer 112 may be protected with a transparent protective coating 114 of polyvinylidene chloride used in semiconductor circuits against moisture penetration (See, section A1 shown in FIG. 2A). Other suitable protective coatings such as polyethylene may also be used instead of, or in addition to, the polyvinylidene chloride coating.

The size and volume of body 110 and its material may be determined by its thickness and governed certain properties to achieve buoyancy. For any diameter, the minimum convexity will be limited by the amount of air space needed in the disc. The volume of air to that of the polyvinyl chloride body may be greater than ($\rho$-1), where $\rho$ (~1.38 gm/cc) is the density of PVC, taking the density of sea water to be one. This criterion may be easily satisfied even with additional components needed. Appropriate hermeticity may be achieved through standard heat welding for thermal plastics such as PVC. In some examples, the body is between 1 to 3 meters in diameter, and it will be understood that the size of each floating mirror will factor into the number of floating mirrors needed in the armada. In some examples, a 1-meter diameter floating mirror is formed and ~$2\times10^{12}$ floating mirrors are deployed. Alternatively, a 3-meter diameter floating mirror may be used and approximately ~$2\times10^{11}$ floating mirrors are deployed. Discs of this size range will have little impact on shipping lanes as ships may advance and push aside discs without damage to itself nor to the discs.

Each floating mirror 100 may have a combination of features for practical implementation. First, the floating mirrors 100 may be reflective on both sides such that waves that may flip the mirrors may not affect the reflective function. Second, the floating mirror 100 may have an effective density of near one. Third, the floating mirror 100 may be hermetically sealed. Fourth, the floating mirror 100 may be sized to be non-interfering on ship navigation and marine life, i.e., 1 to 3 meters in dimension or even larger. Fourth, the floating mirrors may have additional features so as to be self-homing towards the equator to take advantage of (a) near normal illumination and reflection, (b) the relative calm in a small latitude band along the equator, and/or (c) the use of equatorial currents and countercurrents to minimize floating mirror drifts toward land masses.

Each floating mirror may have additional features to allow it to (1) maintain north-south alignment, (2) know its latitude and longitude location near the equator, and/or (3) propel it towards a long-term equilibrium location both latitudinally and longitudinally using an active drive system. In some examples, the deployment latitude may be within the equatorial quiet zone of between ±5°. However, if the floating mirrors veered from the equator to a latitude of 15°, outside of the desirable zone, the projected area is decreased only by ~4% thereby not reducing the reflective effectiveness of the floating mirror. Another important reason for keeping the floating mirrors near the equator is to avoid these mirrors from being trapped in hurricanes. The Coriolis force, a necessary component for hurricane initiation and formation, is negligible in the quiet zone of between ±5° (Henderson-Sellers 1998). This zone is also known as the "equatorial doldrum" (NOAA) and extends to as much as ±10° (Columbia Electronic Encyclopedia), a region within which ancient mariners were trapped owing to the extreme calm for extended periods. Thus, an onboard homing system may aim to keep the floating mirror within ±5° latitude of the equator. A steady longitudinal position may be maintained to ~1° of each floating mirror's initially deployed position to avoid long drift toward land masses.

Turning back to FIG. 1, each floating mirror may include a pumping system 120 that can propel it north-south, and a positioning system (e.g., GPS receiver or latitude/longitude solar sensor) to pinpoint its latitude, longitude, and time. Nature's easterly and westerly currents near the equator may be used to keep the floating mirrors in place. The latter along with the floating mirror's north-south pump-generated movement may be able to achieve positional confinement. In some other examples, a fully self-contained system may be formed without a GPS component.

Briefly, the floating mirror 100 may be equipped with a pumping system 120 that can generate movement north or south with velocities of comparable magnitudes to the natural westerly equatorial currents and the easterly counter current. With the GPS location and its change over time, the natural drift velocity is measured. In some examples, the two mirror surfaces are not contiguous such that the GPS antenna can be embedded along portions of the rim of the two halves of the polymer body and free from any faraday cage effect of the metal coated mirrors and free to receive GPS signals. The pumping system 120 is activated to move latitudinally to seek the counter current to restore its longitude. In this manner, a deployed floating mirror 100 can maintain its steady location by "circling" around its deployed position, the size of this floating mirror residence zone may be governed by the extent of the transition zone. As used herein, the term "residence zone" refers to the preferred geographic area of each floating mirror.

Floating mirror 100 may include one or more embedded permanent magnets 150 such that one axis, with an open channel 140, will be aligned with the earth's magnetic field similar to a compass. Such an open main channel 140 with a water pump will be incorporated in the channel with reversible pumping capability. If the floating mirror is sensed (via GPS, built-in sensor or other means) to be in the northern hemisphere and substantially outside of the ±5° quiet zone, the pump 120 may suck sea water from its southern port 142 and eject the sea water from its northern port 144 thus pushing the floating mirror southward. It will be understood that either port 142,144 may serve as both an inflow or an outflow, and that a reversed pumping action may be used to push the floating mirror northward when in the southern hemisphere.

Turning back to FIG. 1, the north-south cross-section of floating mirror 100 is shown. As discussed, the body 110 of the floating mirror consists of two identical convex or dome-shaped segments, caps or discs 110a,110b joined along the circular rims of the mirror-image discs. A pair of magnets 150 are aligned N-S and diametrically opposite near the rim of the discs. The magnets 150 break the circular symmetry of the floating mirror. The common plane of the caps in which the magnets 150 are imbedded serves as the inversion plane of the floating mirror, the lower half is submerged and the upper half serves as the reflector. Because the floating mirror is symmetric about its longitudinal axis, flipping the floating mirror 180° may result in the same reflector configuration.

In some examples, in the central axis of the caps are located a latitude and longitude sensor 131 which may permit fully self-contained operation in the absence of the GPS. This is provided as a backup design. At any time, the above air-surface sensor may be the active one. Also illustrated are the circularly situated solar cells 130 that power the floating mirror. Colinear with the alignment magnets is a main channel 140 that extends between ports 142,144, the channel defining a cavity for pump 120 situated at the central region of the floating mirror. Within channel 140 is the rotor 122 of the pump, its shaft 124 supported by two stationary flow-through spokes 121. The motor shaft 124 on which pump vanes 126 are mounted on both ends may be supported by a set of conical hydrodynamic bearings. The complementary bearing surfaces are on the stationary spoke and on the rotating shaft. These sets respectively stabilize the rotor 122 for either direction of flow. Alternating radially poled permanent magnets are circumferentially mounted and embedded hermetically in the polymer cylinder. The rotating cylinder 122 is attached to the shaft 124 via flow through spokes 127 in order to preserve unimpeded flow through the motor body. Circumferential stators 128 to drive the rotor 122 are located outside of the flow channel wall. The channel 140 splits into two Y-channels 145 before each magnet alignment position. In some example, only the submerged ports, terminal ends of the Y-channels 145, may be open as inflow and outflow ports. Air-filled "ping-pong balls" may serve as valves 148, sealing off the air exposed upper ports (i.e., the non-submerged ports) allowing for sea water to be pumped in the appropriate direction generating the proper propulsion flow. Since little pressure head needs to be generated, and the desired reversible flow direction, the pump vanes may be perpendicular to the axial hub over their entire span but inclined to the flow direction with characteristic dimension of ~1 to 2 cm. In some examples, six to ten vanes fitted around the hub rotating at 3,000 to 8,000 RPM may be able to generate the desired flow of 4000 cc/sec. A set of built-in fins 160 at the pump ports may prevent floating mirror spinning while maintaining north-south alignment during floating mirror latitudinal movement under pump action.

For the propulsion system, it is important to have an estimate of the latitudinal drift velocity that floating mirrors might need to maintain locational stability. The equatorial surface flow velocity in the east-west direction has a mean speed of ~40 cm/sec. Thus, the propulsion system may be able to handle a latitudinal push of comparable magnitude, or ~40 cm/sec. This will permit floating mirror crossing over east-west flow boundary to maintain longitudinal position and coincidentally latitudinal confinement.

In some embodiments, the floating mirror has a weight of about 10 Kg based on the 1-meter diameter PVC mirror base material and a wall thickness of ~1/2 cm. To maintain north-south motion of comparable magnitude, the flow generated momentum may be ~$4\times10^5$ gm-cm/sec, and the pump may eject a column of sea water the amount contained in 100 cm, the diameter of the floating mirror, and a flow channel area of 10 to 40 $cm^2$ (~3.6 to 7.1 cm diameter cross section) at a corresponding velocity of ~400 to 100 cm/sec. The flow generated may be between 3000 cc/sec and 5000 cc/sec, or approximately 4000 cc/sec. There is little drag on the low-profile floating mirror at these low velocities on seawater (40 cm/sec is around 1 mile/hr). Viscous loss through the channel for the relevant conditions is less than 1 mmHg (0.013 pascal). The flow power at 4000 cc/sec required is ~0.5 watt. One would allow for added capacity. A 2-watt system should be able to handle floating mirror drift velocities few folds greater than the mean, and the power needs for other on-board electronics. A small portion of the mirror will in addition have a 5-watt collector (1/3 sqft using standard solar cell technology of 15 W/sqft). Therefore, 3% of the reflector area will be used for solar cells 130 which in one embodiment can be circumferentially set around the sensor 131. Such a power system should have ample capability to impart movement to the floating mirrors. A supplementary rechargeable battery may be incorporated to maintain electronic capability at all times. A 50 watt-hr Li-ion battery (~250 gm) may also be capable of operating the pump overnight and overcast days. Power requirement may scale with the surface area of the floating mirror.

Figure 3:
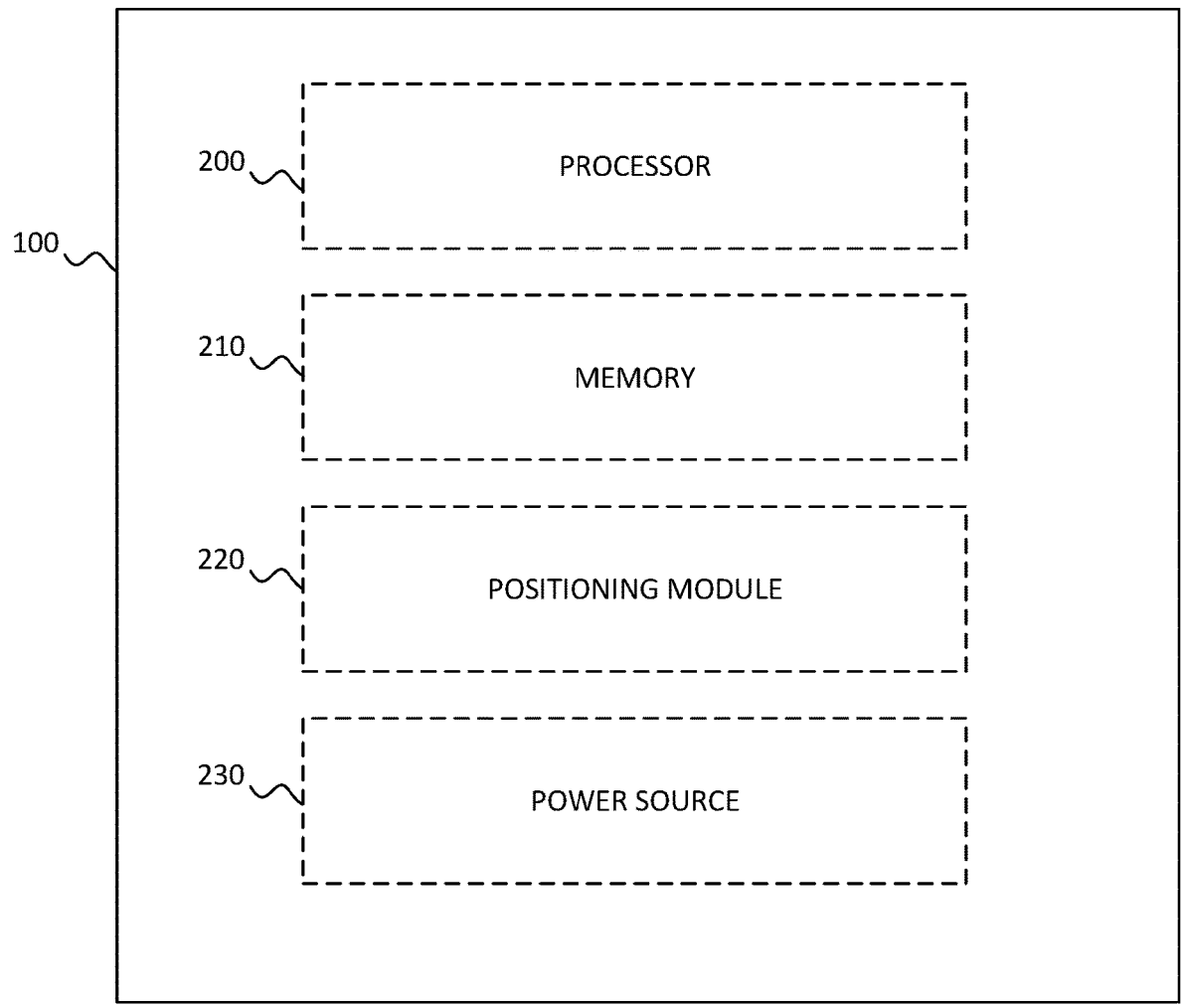
FIG. 3. is a schematic illustration of certain electronic components of a floating mirror.

As shown in FIG. 3, each floating mirror 100 may optionally include a processor 200, a memory 210, a positioning module 220 and a power source 230 (e.g., a rechargeable and replaceable battery). Processor 200 may be designed with specific functional needs incorporating a GPS receiver chip and location memory, latitude and longitude determination, pump motor speed control, and/or battery charge and discharge. ASIC (application specific integrated circuit) technology could be well suited for such application at very low cost.

In keeping the floating mirrors within ±5° of the equator, there is an eastward drift along the NECC (north equatorial countercurrent) of ~40 cm/sec amounting to ~12 months for crossing the major oceans. Each floating mirror may have longitudinal position information over time and thus its drift velocity. Such information can be used to help a floating mirror utilize its propulsion system to seek the NEC or SEC (north or south equatorial current) to move it westward without hitting land masses. Seeking the boundary between the equatorial current and countercurrent may stabilize each floating mirror longitudinally while staying within the range of ±5° latitudinally. Indeed, the boundary of the northern edge of the SEC and the southern edge of the NECC is between about 3° and 4° north of the equator in the Atlantic. This border may well be the optimum region for the floating mirrors to find its longitudinal stable position. The northern edge of the SEC has a westerly drift of ~30 cm/sec comparable to that of the NECC. Thus, in some examples, a floating mirror may include an onboard processor 200 that maintains a historical record of the longitudinal location to allow a floating mirror in the northern hemisphere to move north if there is an easterly drift or to move south if there is a westerly drift of more than 10 Km from its initial deployment location. For example, a floating mirror in the southern hemisphere that is moving westerly, may begin to move north. Such a feature may minimize floating mirrors from beaching permitting self-correcting positional operation once its initial longitude is programed just before being thrown overboard. With a transition zone of 1° to 2°, and latitudinal velocity matched to that of the longitudinal drift velocity, the residence zone of each floating mirror could be confined to a specific area, (e.g., within 200 Km×200 Km).

In the absence of GPS, an onboard sensor system can provide the longitude and latitude determination. One or more miniature solar cell(s) 131 with orientational control will be mounted at the center of each side of the convex surface. Optionally, a hemispherical transparent dome 132 may hermetically seal and protect the solar cell 131 (see FIG. 1). A simple cam mechanism is incorporated for mounting the miniature solar cell such that its normal vector to the cell surface can be swept ±45° on the plane normal to the mirror surface and the N-S axis. Solar cell 131 is centrally located relative to the dome 132 such that no solar intensity distortion could be introduced during the sweeping action for longitude and latitude determinations. The mirror's angular location relative to the solar incidence can be easily determined just by sweeping the cell and finding the maximum signal relative to the mirror's normal axis. Straight forward time averaging will account for floating mirror normal axis variations due to waves. One notes that the magnetic and geometric poles have a relative angle of 9.9°. This angle may be accounted for in the latitude determination. During winter and summer solstices, the orbital angle ($\theta$) when tilted towards north or south may indicate a southern or northern hemisphere location respectively. Since the earth has a tilt of ~23.4° relative to the solar orbital plane, location detection relative to the equator will require an embedded internal calendar clock to correct for seasonal variation to the measured $\theta$. The earth's tilt may reduce the areal reflection by a mere 8% during winter and summer solstice relative to the equinoxes.

Similarly, the solar east-west angle (relative longitude) can be measured with sweeping along the plane orthogonal to the N-S plane once a day at the same clock time or at other predetermined times. With the relative change in longitude over a 24-hour period or other known time intervals, a drift velocity can be obtained. With its initial deployment longitude and time, the instantaneous longitudinal position can also be recorded. With the acquired latitudinal and longitude information, each floating mirror can be easily localized to within ~1° with a proper propulsion system taking advantage of the near equatorial currents and counter currents.

In use, the initial global deployment could be concentrated within a degree of the equator. However, over time, the floating mirrors may be dispersed but contained within ±5° due to the longitudinal stabilization feature. These meter-sized floating mirrors may not interfere with shipping navigation nor marine life. Adding or subtracting the number of mirrors is possible and may be performed in stages. The first step may be the deployment of a small number (e.g., 1,000-2,000) of mirrors and the monitoring of their performance and dispersion for 1 year. These experimental floating mirrors may be fitted with a processor, storage and a battery, similar to a smart phone technology, for remote data collection and study. In addition, these initial studies may have a component dedicated to investigating the reliability of the floating mirrors.

Eventual full deployment may be between the Prime Meridian and 40° W on the Atlantic Ocean, 105° W to 165° E on the Pacific Ocean, and 50° E to 90° E on the Indian Ocean. The deployment longitudinal boundaries may be around 10° or ~1000 Km from land masses. Most significantly, the described solar management may provide another method to reduce global temperature slowing down potentially catastrophic climate change especially from potentially unfavorable albedo run away while humanity continues to modify energy consumption habits and technology development into the use of cleaner energy and the implementation of $CO_2$ mitigation and sequestration. This technology may have an advantage with manageable and practical adjustments via discs thrown overboard or retrieved.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

It will be appreciated that the various dependent claims and the features set forth therein can be combined in different ways than presented in the initial claims. It will also be appreciated that the features described in connection with individual embodiments may be shared with others of the described embodiments.

What is claimed is:

1. A floating mirror comprising:
   a buoyant body extending between a first end and a second end;
   a pump housed within the buoyant body; and
   a reflective material disposed on opposite surfaces of the buoyant body.

2. The floating mirror of claim 1, wherein the buoyant body is in the shape of an oblate spheroid.

3. The floating mirror of claim 2, wherein the buoyant body is unitarily formed and comprises a water impermeable polymer material.

4. The floating mirror of claim 1, wherein the buoyant body includes two convex discs coupled together at base rims.

5. The floating mirror of claim 1, wherein the buoyant body further defines a main channel extending along a longitudinal axis between the first end and the second end.

6. The floating mirror of claim 5, wherein the main channel terminates in two Y-channels disposed on each end of the buoyant body.

7. The floating mirror of claim 6, further comprising a respective air-filled valve disposed adjacent each of the two Y-channels.

8. The floating mirror of claim 5, wherein buoyant body includes at least one inflow port disposed at the first end, and at least one outflow port disposed at the second end, the inflow port and the outflow port being in communication with the main channel.

9. The floating mirror of claim 1, wherein the pump includes a stator and a rotor.

10. The floating mirror of claim 1, further comprising a dome disposed on opposing surfaces of the buoyant body, each dome having at least one of a solar cell and a latitude and longitude position sensor.

11. The floating mirror of claim 1, further comprising a processor and a power source.

12. The floating mirror of claim 1, further comprising a GPS positioning system.

13. The floating mirror of claim 1, further comprising at least one fin disposed adjacent each end of the buoyant body.

14. The floating mirror of claim 1, wherein the reflective material is coated on opposite surfaces of the buoyant body, and further comprising a protective coating on the reflective material.

15. The floating mirror of claim 1, wherein the reflective material comprises a metallic reflector.

16. A floating mirror comprising:
- a buoyant body extending between a first end and a second end;
- a reflective material disposed on opposite surfaces of the buoyant body; and
- a pair of magnets disposed adjacent opposing ends of the buoyant body.

17. A floating mirror comprising:
- a buoyant body extending between a first end and a second end;
- a reflective material disposed on opposite surfaces of the buoyant body; and
- a processor configured and arranged to define a residence zone and limit movement of the floating mirror to the residence zone.

18. A method of limiting global temperature rise, comprising:
- providing at least one floating mirror of claim 17; and
- deploying the floating mirror in an ocean near an equator.

19. The method of claim 18, wherein providing the at least one floating mirror comprises providing billions to trillions of floating mirrors, and further comprising a step of defining a residence zone for each of the at least one floating mirror and limiting the movement of each of the at least one floating mirror to the residence zone.

* * * * *